(12) United States Patent
Vance

(10) Patent No.: US 7,239,378 B2
(45) Date of Patent: Jul. 3, 2007

(54) PLATFORM BASED IMAGING SYSTEM

(76) Inventor: Larry Vance, 1729 Hwy. 35 S., Kalispell, MT (US) 59901

( * ) Notice: Subject to any disclaimer, the term of this patent is extended or adjusted under 35 U.S.C. 154(b) by 282 days.

(21) Appl. No.: 10/652,358

(22) Filed: Aug. 28, 2003

(65) Prior Publication Data

US 2005/0046822 A1  Mar. 3, 2005

(51) Int. Cl.
*G01C 3/08* (2006.01)
(52) U.S. Cl. .................................................. 356/4.1
(58) Field of Classification Search ................ 356/4.1
See application file for complete search history.

(56) References Cited

U.S. PATENT DOCUMENTS

| | | | |
|---|---|---|---|
| 5,471,056 A | * | 11/1995 | Prelat .......................... 250/253 |
| 6,357,910 B1 | * | 3/2002 | Chen et al. .................. 374/131 |
| 2003/0047675 A1 | * | 3/2003 | Proksch et al. ............. 250/234 |
| 2003/0133196 A1 | * | 7/2003 | Wine et al. .................. 359/578 |
| 2005/0012052 A1 | * | 1/2005 | Platzgummer et al. . 250/492.21 |

* cited by examiner

*Primary Examiner*—Thomas H. Tarcza
*Assistant Examiner*—Luke D. Ratcliffe
(74) *Attorney, Agent, or Firm*—Sarah J. Rhoades

(57) ABSTRACT

A platform-based imaging system includes a nanotechnology-modified lens assembly mounted on the platform. A nanotechnology-modified information processing module is provided to receive information from the lens assembly. A nanotechnology-modified connection mechanism operatively and remotely connects the lens assembly with the information processing module.

5 Claims, 1 Drawing Sheet

PLATFORM BASED IMAGING SYSTEM

FIELD OF THE INVENTION

The present invention relates generally to imaging of desired surface characteristics via a remote, platform-based sensor.

BACKGROUND OF THE INVENTION

The advantages of platform-based imaging has been long-recognized. Long-range imaging has been known from the time that human observers first went aloft in balloons to make sketches of armies below. Long-range imaging has evolved to include aerial surveillance via powered flight through satellite imaging. Close-range platform-based imaging began with the first magnifying optics, and now employs electron microscopes to detect characteristics of submolecular objects. The need to discriminate and map characteristics of a variety of surfaces led to the development of multispectral instruments to gather and classify information. However, multispectral instruments only record a few bands of the electromagnetic spectrum. Thus, they have little ability to identify a wide variety of surface attributes.

These deficiencies gave rise to techniques involving subdividing the ultraviolet, visible and infrared spectra into distinct "bins", known as Multispectral Imaging (MSI). In MSI, multiple images of a scene or object are created using light from different parts of the spectrum. If the proper wavelengths are selected, multispectral images can be used to detect an item of interest, such as mineral deposits, camouflage, thermal emissions, and hazardous wastes.

A primary goal of using multispectral remote sensing image data is to discriminate, classify, identify, and quantify materials present in the image. Another important application is subpixel surface characteristic detection, allowing identification of surface attributes having sizes smaller than the pixel resolution. Also important is abundance estimation, which allows detection of concentrations of different signature spectra present in pixels. One difficulty in remote sensing image analysis is that a scene pixel can be mixed linearly or nonlinearly by different materials resident in the pixel, where direct application of commonly used image analysis techniques generally do not work well.

Hyperspectral imaging (HSI) is a method in which remotely sensed data is typically collected using an opto-electrical system that measures reflected solar irradiance. Hyperspectral sensors currently collect data in hundreds of narrow, contiguous wavelengths, so that for each pixel in an image, a reflectance spectrum can be derived that is dependent upon the composition and structure of materials present. Many substances have a unique spectral signature that can be used for identification. In the alternative, the reflective properties of characteristics known to be present can be identified, then "learned" by processing software so as to be readily identified. Moreover, the hundreds of channels allow the detection or identification of more than one material in a pixel. This capability is unique to hyperspectral remote sensing.

The difference between multispectral and hyperspectral is the far greater spectral resolution of the latter achieved by splitting the reflected solar irradiance into many more channels. HSI, like MSI, is a passive technique, in that it depends upon the sun or some other independent illumination source. However, in contract to MSI, HSI creates a larger number of images from contiguous, rather than disjoint, regions of the spectrum, typically, with much finer resolution. This increased sampling of the spectrum provides a great increase in information. Many remote sensing tasks which are impractical or impossible with an MSI system can be accomplished with HSI. The wealth of information available from HSI makes it useful in a variety of applications, such as mineral exploration, hazardous waste remediation, habitat mapping, invasive vegetation detection, and ecosystem monitoring, to name but a few.

One example of an airborne hyperspectral imaging system is the ESSI Probe-1 hyperspectral instrument from Earth Search Science, Inc. The Probe-1 hyperspectral remote sensing airborne system records high resolution spectral reflectance from the earth's surface. Probe-1 is a scanning instrument which records 512 cross-track pixels, each covering 128 wavelengths of light in the 400–2,500 nanometer range. Pixel size is typically between 5 and ten meters on a side as determined by the aircraft's altitude above the surface. Higher resolution is possible if the sensor is mounted on a helicopter rather than a fixed-wing aircraft.

Probe-1 images are built up by collecting successive scan lines as the aircraft moves forward. The size of the imagery in the along-track dimension is determined by the length of the flight line. For example, a 20 kilometer line with 5 meter pixels would be 4,000 by 512 pixels, for a total of 2 million pixels covering over 50 square kilometers. A reflectance spectrum covering 128 wavelengths from visible light through the near infrared and short-wavelength infrared can be derived for each pixel. The field of view of the Probe-1 (60 degrees) allows Earth Search to collect date over large areas quickly.

While the advantages of hyperspectral imaging are many, the mechanisms by which such imaging has been accomplished have presented several problems. For example, optics used in known sensors are typically relatively bulky and unwieldy. In long-range hyperspectral sensors, the gimbaled mounting systems require special structure for mounting and operation. The Probe-1 instrument, while effective, occupies a relatively large amount of cabin space. Known optics require a combination of low altitude, slow airspeed, and degree of stability difficult to obtain using standard aircraft. Similarly, close-range platform-based systems are often difficult to operate in desired applications, such as those requiring close proximity to a living human subject.

Nanotechnology, also known as molecular nanotechnolgy, allows for control of the material world at the nanoscale by taking advantage of quantum-level properties. Nanotechnology provides the means by which systems and materials can be built with exacting specifications and characteristics. The composition and structural modification of existing materials on the nanometer scale can drastically enhance some properties and lead to unprecedented physical effects. In the case of simple materials, structural modification on the nanometer scale may yield an entirely new class materials, whose chemical and physical properties are significantly different from those of the bulk material. This is the bottom-up approach to the manipulation of materials on the nanometer scale and then their assembly into larger scale structures.

Micro-Electro-Mechanical Systems (MEMS) technology is a related and interwoven field of nanotechnology. MEMS technology enables the integration of mechanical, electrical, chemical, thermal, fluidic, magnetic, and optical components on a microscopic scale. MEMS contain elements which allow for the interconversion of energy between these different domains using fabrication techniques leveraged off microelectronics. MEMS devices operate on a sub-conventional scale: minimum feature sizes for micromachining processes often measure under a tenth of a micron. Forces generated by microactuators range from piconewtons to millinewtons, and the displacement of microstructures can be measured to less than a picometer. The incorporation of nanotechnology-modified components and MEMS into a hyperspectral imaging sensor like the Probe-1 can solve the present issues in the field.

In light of the foregoing, there is a need for a MEMS or nanotechnology-modified simple, platform-based remote sensing system capable of overcoming or deducing the drawbacks of known systems, which to be utilized for the imaging and mapping of surface characteristics. The present invention provides such a device.

SUMMARY OF THE INVENTION

Accordingly, the present invention is directed to a platform-based imaging system that incorporates MEMS or nanotechnology-modified components, the inclusion of which will allow mobile, remote, immediate information processing and optics analysis. A MEMS or nanotechnology-modified information processing module is provided to receive information from a MEMS or nanotechnology-modified lens assembly. A MEMS or nanotechnology-modified connection mechanism operatively and remotely connects the lens assembly with the information processing module.

The present invention contemplates variations in the number and use of the respective components such that it may include a plurality of MEMS or nanotechnology-modified components. In one embodiment the lens assembly will comprise at lease one MEMS or nanotechnology-modified lens. The present inventions contemplates that the lens assembly may include a MEMS or nanotechnology-modified mirror. Another embodiment calls for a MEMS or nanotechnology-modified lens assembly with a multi-spigot lens assembly. One embodiment of the present invention will allow for the MEMS or nanotechnology-modified information processing module to be mounted on the platform. The present invention contemplates a mobile platform for mounting the components. One embodiment calls for the mobile platform to be airborne.

The accompanying drawings are included to provide a further understanding of the invention and are incorporated in and constitute a part of this specification and together with the description serve to explain the principles of the invention.

DETAILED DESCRIPTION OF THE INVENTION

Figure 1:
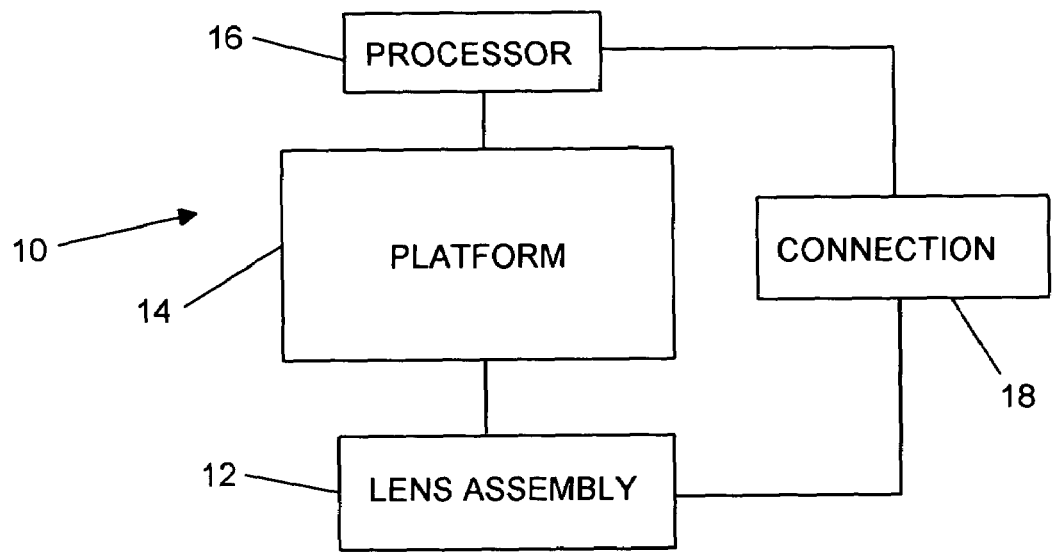
FIG. 1 is a schematic view of an embodiment of a platform-based imaging system in accordance with the principles of the present invention.

FIG. 1 illustrates an imaging system 10 representing one embodiment of the present invention. The imaging system 10 includes a lens assembly 12 associated with a platform 14. The platform 14 is adapted to enable the lens assembly 12 to be placed in proximity with a subject so that information concerning characteristics of interest of the subject can be gathered. For example, if it is desired to gather information concerning the presence and distribution of certain minerals on the surface of the Earth within a specific area, the platform can be airborne, such as a fixed-wing aircraft, drone, lighter-than-air craft, or other airborne mechanism. If it is desired to gather information concerning characteristics of human skin, the platform can be provided as a hand-held instrument or the like. The precise nature of the platform will be dictated by the size and nature of the subject of observation.

The lens assembly 12 is preferably provided with one or more MEMS or nanotechnology-modified components. These may take the form of at least one MEMS or nanotechnology-modified lens, such as those available from NanoOpto Corporation, or other suitable lenses. The present invention contemplates the use of telescoping lenses among the available lenses with specific useful applications. Nanotechnology-modified mirrors may also be employed. The advantages of nanotechnology-modified components accrue in many ways, but of principal concern in the present invention are precision and size. Conventional lenses are ground in known manner, and are therefore limited in their signal-to-noise ratio by the precision of the grinding equipment itself. Using nano- or MEMS-technology to modify a lens and/or mirror makes possible degrees of optical precision heretofore unknown in hyperspectral imaging. Furthermore, nano- or MEMS-technology enables optical components to be greatly miniaturized, thus facilitating a reduction in the demands upon, and size of, the platform on which the lens assembly is carried.

The lens assembly 12 is remotely connected to an information processor 16 via a connection mechanism 18. The information processor 16 can be provided as a PC or other suitable device programmed to accept and interpret raw data gathered by the lens assembly 12. The information processor 16 can also be modified and constructed using one or more MEMS or nanotechnology-modified components. The components can take the form of nanofabricated chips or other processor components, as wells as connectors between processor components themselves, examples of which are fabricated at the University of California at Santa Barbara's Nanofabrication Facility, a part of the National Nanofabrication Users Network.

The connection mechanism 18 can be any suitable remote connection device, such as a remote wireless connection, fiber optic connection, or electrical connection. The connection mechanism 19 can also be modified and constructed using one or more MEMS or nanotechnology-modified components, such as switching and fiberoptic components developed by University of California at Berkeley. Depending upon the specific application, the processor can be located on the platform itself, or at a remote location.

Figure 2:
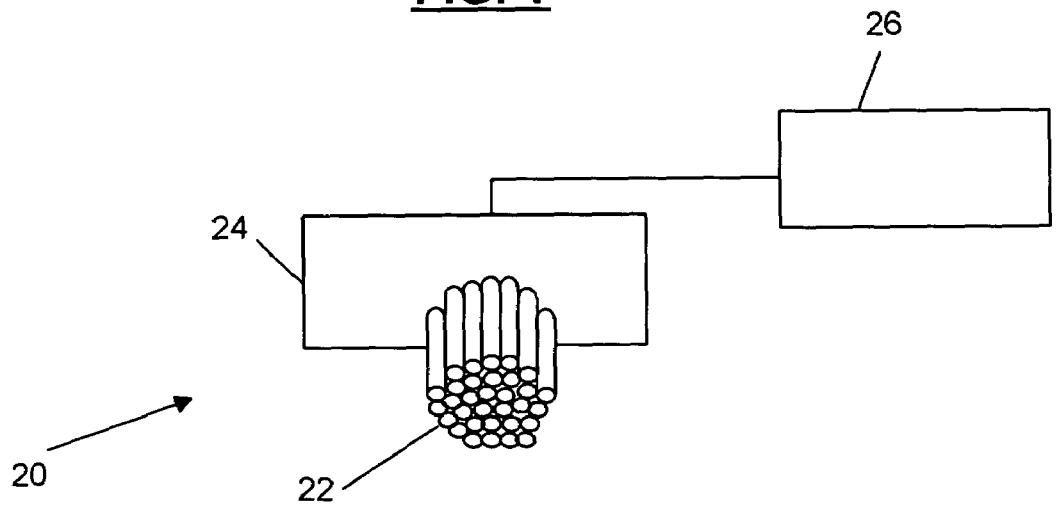
FIG. 2 is a schematic perspective view of an embodiment of a platform-based imaging system in accordance with the principles of the present invention.

An alternative embodiment of a platform-based imaging system 20 is shown in FIG. 2. In the system 20, a lens assembly 22 mounted on a platform 24 includes a plurality of lens mechanisms bundled together. Each lens mechanism is selectively actuatable to telescope, or transmit information regarding a specific small unit or segment of spectral information, preferably down to the sub-pixel level, by a control processor 26. This arrangement allows the information processor 26 to control the collection of each segment of information in the nature of a spigot, sensing only those areas of interest in a particular data-gathering session. An additional feature of the present invention disclosed, the manipulation and data collection programming may occur while the imaging system is in use. Thus, if it is desired to sense the presence of a certain type of vegetation on a land area, the processor can be programmed to collect only information in a certain spectral range corresponding to the "signature" of that vegetation, and ignore other signals. Alternatively, the information processor 26 can collect all of the data collected by all of the lens mechanisms, and subsequently sort the data to suit various areas of interest.

It will be appreciated by those of skill in the art that this arrangement can be varied within the context of the illustrated embodiments. The present invention enables a user to sample thousands, rather than hundreds, of channels of information and to greatly increase the signal-to-noise ratio, thus increasing the resolution and quality of information gathered. The present invention enables the production of usable data at the sampling site in real time, rather than known methods requiring gathering a data cube and processing it at a later time.

Although the present invention has been described with reference to specific embodiments, those of skill in the art will recognize that changes may be made thereto without departing from the scope and spirit of the invention as defined by the appended claims.

What is claimed is:

1. A platform-based imaging system comprising:
a multi-spigot lens assembly mounted on a platform;
  wherein the multi-spigot lens assembly comprises at least one MEMS or nanotechnology-modified component;
  wherein at least one of the MEMS or nanotechnology-modified components of the lens assembly is a mirror;
a MEMS or nanotechnology-modified information processing module; and
a MEMS or nanotechnology-modified connection mechanism adapted and constructed to operatively and remotely connect the lens with the information processing module.

2. A platform-based imaging system comprising:
a MEMS or nanotechnology-modified multi-spigot lens assembly mounted on the platform;
a MEMS or nanotechnology-modified information processing module;
a MEMS or nanotechnology-modified connection mechanism adapted and constructed to operatively and remotely connect the lens with the information processing module.

3. The platform-based imaging system in accordance with claim 2 wherein the lens assembly comprises at least one MEMS or nanotechnology-modified component.

4. The platform-based imaging system in accordance with claim 3 wherein the lens assembly comprises at least one MEMS or nanotechnology-modified mirror.

5. A platform-based imaging system comprising:
a multi-spigot lens assembly, with at least one MEMS or nanotechnology-modified component and at least one MEMS or nanotechnology-modified mirror, mounted on the platform;
a MEMS or nanotechnology-modified information processing module;
a MEMS or nanotechnology-modified connection mechanism adapted and constructed to operatively and remotely connect the lens with the information processing module.

* * * * *